H. C. HOLTHOFF.
SETTLING AND SEPARATING TANK.
APPLICATION FILED JAN. 27, 1909.
1,043,698.
Patented Nov. 5, 1912.
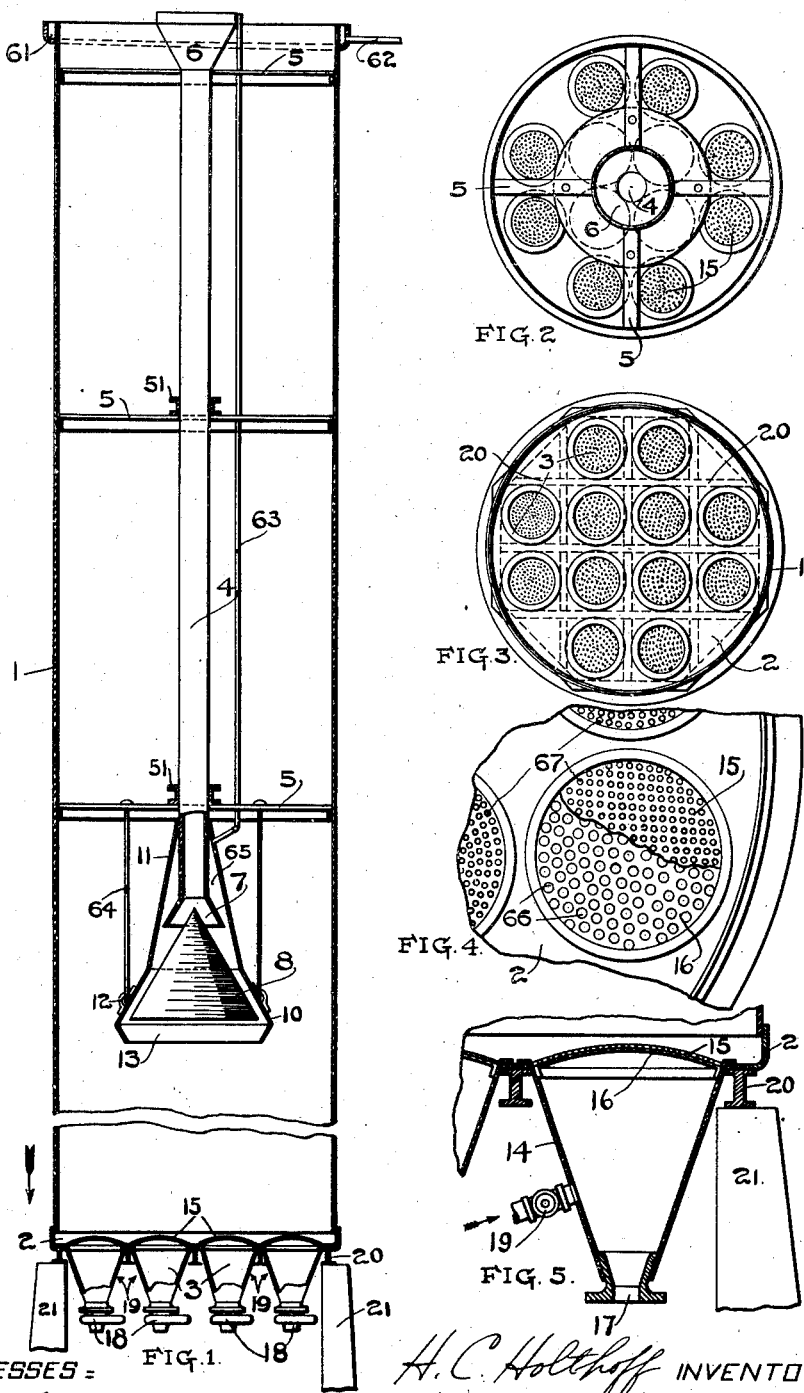

UNITED STATES PATENT OFFICE.

HENRY C. HOLTHOFF, OF MEXICO, MEXICO, ASSIGNOR TO ALLIS-CHALMERS COMPANY, OF MILWAUKEE, WISCONSIN, A CORPORATION OF NEW JERSEY.

SETTLING AND SEPARATING TANK.

1,043,698. Specification of Letters Patent. Patented Nov. 5, 1912.

Application filed January 27, 1909. Serial No. 474,356.

*To all whom it may concern:*

Be it known that I, HENRY C. HOLTHOFF, a citizen of the United States of America, residing at Mexico, in the State of Mexico, Mexico, have invented a certain new and useful Improvement in Settling and Separating Tanks, of which the following is a specification.

This invention relates to improvements in the construction of settling or separating tanks.

The object of the invention is to obtain a simple and efficient means of separating the liquid from the solid particles contained in slimes or pulp by decantation or settling.

A clear conception of the invention can be obtained by referring to the accompanying drawings in which like reference characters designate the same part in different views.

Figure 1 is a central vertical section of a settling tank with the improved features of the invention applied thereto. Fig. 2 is a plan view of the device shown in Fig. 1. Fig. 3 is a section of the tank taken at the broken line Fig. 1 and looking in the direction of the arrow. Fig. 4 is an enlarged plan view of a fragment of the bottom of the tank. Fig. 5 is an enlarged central vertical section of the device shown in Fig. 4.

The tank or reservoir 1 having the bottom 2 is supported by a frame work of beams 20 which rest upon the piers 21. The height of the reservoir 1 is such that when it is filled with a liquid, the pressure at the bottom 2 will be about thirty pounds to the square inch.

The inlet pipe 4 is supported in the center of the reservoir 1 by means of braces 5 which extend radially from the sides of the reservoir 1 and are attached to collars 51, see Figs. 1 and 2. The pipe 4 is provided with a conical hopper 6 at its upper end and a conical charging opening 7 at its lower end, the distance between hopper 6 and charging opening 7 being about half the length of the reservoir 1, and the charging opening being therefore located at the mid portion of the tank. The extreme upper edge of the hopper 6 is slightly above the level of the top of the reservoir 1 about which the annular groove or trough 61 is formed. This trough 61 is slightly inclined toward the discharge pipe 62 so as to allow the withdrawal of any liquid contained in the trough 61.

A conical guide tube 11 is attached to the lower end of the tube 4 somewhere above the discharge opening 7, forming an air tight connection between the pipe 4 and guide tube 11. A second guide tube 10 is attached to the lower edge of the tube 11 and has sides which form a greater angle with the axis of the pipe 4 than those of the guide tube 11. A cone 8 having a surface parallel to the inner surface of the guide tube 10 is suspended in any suitable manner within the guide tube 10 and directly below the charging opening 7, its location being such as to leave an annular space between the surface of the cone 8 and the inner surface of the guide 10. A tapered guide 13 is attached to the guide 10 below the lower end of the cone 8, the slope of the surface of the guide 13 being opposite to that of the guide tube 10. The inner edge of the guide 13 is of size approximately that of the outer edge of spreading cone 8. The three-section guide cone is held into position by braces 64 which connect with lugs 12 on the surface of guide tube 10. An air pipe 63 leads from the annular chamber 65, formed between guide 11 and the pipe 4, to the atmosphere, somewhere above the top of the reservoir 1.

The bottom 2 of the reservoir 1 supports a number of hoppers 14 having automatic quick relief valves 18 at their lower ends. Fluid pressure inlets 19 lead into the sides of the hoppers 14 near their bottoms and connect with some source of either air, water or steam under pressure. A plate 16 containing large perforations 66, see Figs. 4 and 5, is placed above each of the hoppers 14 and forms the support for a second plate 15 containing smaller perforations 67, the surfaces of the plates 16, 15, being convex with reference to the interior of the hoppers 14.

In operation of the device, the slimes or pulp are admitted into the reservoir 1 through the hopper 6, pipe 4 and the space about the cone 8. As they emerge from charging opening 7, they slide slowly down the surface of the cone 8, any air contained in the slimes passing up into the space 65 from which it is discharged through the pipe 63. Upon reaching the bottom of the cone 8, the slimes strike the converging guide 13 and are deflected toward the center of the reservoir 1. The materials are therefore deposited in the tank without disturbance and at the point where same may then naturally spread both inwardly and outwardly from the annular form in which they leave the spreading means. As they settle toward the bottom 2 of the reservoir 1, the slimes are spread evenly over the plates 15 forming the tops of the hoppers 14. The liquid then rises until the entire reservoir 1 is filled, the solid particles at the bottom being compressed by the hydrostatic head of the liquid above them. When the mass at the bottom has reached a consistency equal to about that of putty, the quick relief valves 18 are opened to a definite position and so set and the thick mass of slimes will be forced continuously through the plates 15, the hoppers 14, and out of the discharge openings 17. As the clean liquid rises in the reservoir 1 and flows over the upper edge, it falls into the trough 61 from which it is withdrawn through the pipe 62.

If through any cause the plates 15 or hoppers 14 should become clogged, any suitable fluid under pressure can be admitted through the fluid pressure inlets 19, thus removing the obstructing medium.

The peculiar advantage of the plates over the hoppers is that the space within the hoppers and below the plates may be maintained at a pressure less than that immediately above them, so that each opening will be active and afford a flow therethrough. If "piping" takes place at all it will occur at each of these openings and thus be substantially uniform throughout the tank, whereas in the old tanks with uncovered hopper there would occur a single "pipe" or direct channel to the single opening which would then discharge liquids from higher levels and so be objectionable.

It should be understood that it is not desired to be limited to the exact details of construction shown and described, for obvious modifications will occur to a person skilled in the art.

It is claimed and desired to secure by Letters Patent,—

1. The combination of a tank free from normally operating positive functional agitating means, an inlet pipe charging at the mid-portion of said tank, a plurality of discharge hoppers distributed over the entire bottom of said tank to prevent piping of material, and controllable discharge means at the bottom of said hoppers.

2. The combination of a tank, an inlet pipe terminating near the middle of said tank, a spreader below the end of said pipe for deflecting the charge outwardly, and a deflector surrounding said pipe and spreader and having its terminating edge of size approximately that of the terminating edge of the outwardly deflecting spreader and deflecting inwardly the outwardly deflected charge, the terminal edges of said spreader and deflector being located approximately central between the axis and the walls of said tank.

3. The combination of a tank, an inlet pipe terminating near the middle of said tank, a spreader below the end of said pipe for deflecting the charge outwardly, a deflector surrounding said pipe and spreader and forming a chamber about same and deflecting inwardly the outwardly deflected charge, and a pipe leading upwardly from the upper part of said chamber to atmosphere at the top of the tank.

4. The combination of a slime settling tank having a plurality of hoppers distributed over the entire bottom of said tank for uniform discharging, a separate diaphragm covering each of said hoppers, and controllable discharge means at the bottom of said hoppers.

5. The combination of a slime settling tank free from normally operating positive functional agitating means and having relatively high side walls, an inlet pipe charging at the mid-portion of said tank, a drain trough near the top of said tank, a plurality of hoppers distributed over the entire bottom of said tank for uniform discharging, and controllable discharge means at the bottom of said hoppers.

6. The combination of a tank free from normally operating positive functional agitating means, an inlet pipe charging at the mid portion of said tank, a plurality of discharge hoppers at the bottom of said tank for preventing piping of material, and controllable discharge means at the bottom of said hoppers.

7. The combination of a slime settling tank having a plurality of hoppers at the bottom of said tank for discharging and preventing piping of material, a separate diaphragm covering each of said hoppers, and controllable discharge means at the bottom of said hoppers.

8. The combination of a slime settling tank free from normally operating positive functional agitating means and having relatively high side walls, an inlet pipe charging at the mid portion of said tank, a drain trough near the top of said tank, a plurality of hoppers at the bottom of said tank for preventing piping of material, and controllable discharge means at the bottom of said hoppers.

In testimony whereof, I affix my signature in the presence of two witnesses.

H. C. HOLTHOFF.

Witnesses:
H. C. CASE,
G. F. DE WEIN.